Oct. 10, 1944.   G. A. GOESSLING   2,359,839
INJECTION MOLDING MACHINE
Filed Dec. 21, 1942
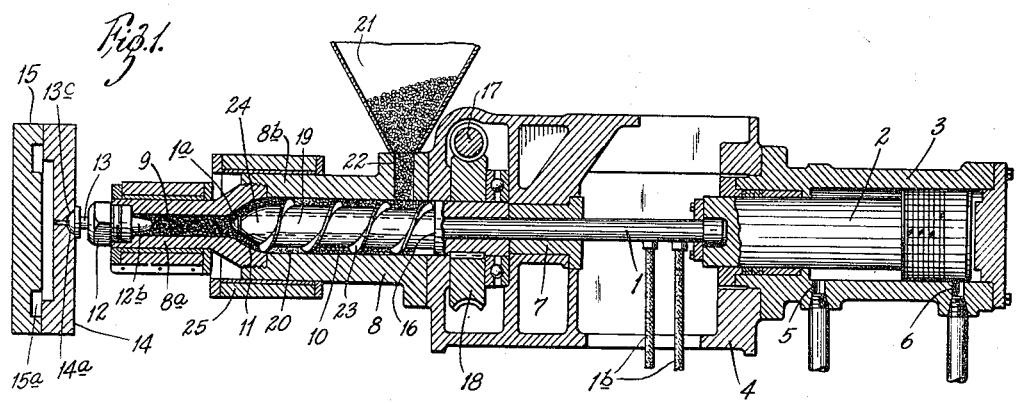
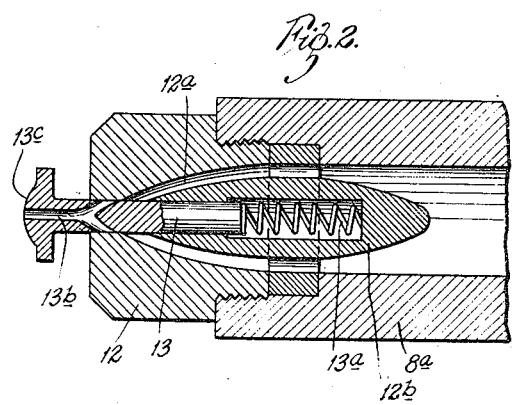
INVENTOR
Gerald A. Goessling
by [signature]
HIS ATTORNEYS.

Patented Oct. 10, 1944

2,359,839

UNITED STATES PATENT OFFICE 2,359,839

INJECTION MOLDING MACHINE

Gerald A. Goessling, St. Louis, Mo., assignor to Pro-Phy-Lac-Tic Brush Company, Florence, Mass., a corporation of Delaware Application December 21, 1942, Serial No. 469,623

4 Claims. (Cl. 18—30)

This invention relates to machines for injection molding or die casting of plastics, and more particularly to the mechanism for forcing the heat-softened plastic material from an injection cylinder into the mold by means of a ram reciprocable in said cylinder. The invention has for its principal object to increase the plasticizing speed and capacity of the injection cylinder without lengthening the stroke of the ram, without loss of injection pressure, and without increasing the power required to operate said ram. Other objects are to provide a more uniform flow and thorough breaking up and heating of the material in the injection cylinder. The invention consists in the injection molding machine and in the construction, combinations and arrangements of parts hereinafter described and claimed.

In the accompanying drawing, which forms part of this specification and wherein like symbols refer to like parts wherever they occur, Fig. 1 is a central longitudinal section through an injection molding device embodying my invention; and Fig. 2 is an enlarged fragmentary central longitudinal section through the nozzle end of the injection cylinder.

The device shown in Fig. 1 of the accompanying drawing comprises a horizontally disposed injection ram or plunger 1, which has a tapered working or forward end 1a and is secured at its rear end to a fluid actuated piston 2 for reciprocation thereby. The piston 2 works in a cylinder 3 which is fixed to the rear end of a supporting housing 4, the piston being actuated by fluid pressure supplied to the cylinder through a port 5 at one end thereof and a port 6 at the opposite end thereof. The ram 1 extends through the housing 4 beyond the front end thereof and is slidably supported in a non-rotary bushing 7 mounted in said housing near the forward end thereof. In accordance with common practice, the ram is cooled with water circulated therethrough by flexible pipes 1b communicating therewith.

Rigidly fixed to the forward end of the housing 4 coaxial with the ram 1 is an injection cylinder 8 whose bore has a forward or outer end portion 9 of relatively small diameter, an inner or rear end portion 10 of relatively large diameter, and a forwardly tapering intermediate portion 11 which connects the large diameter of said bore with the small diameter thereof. For convenience of manufacture and assembly, the cylinder 8 comprises a front section 8a and a rear section 8b that are threaded together, the front section forming the reduced outer end portion 9 of the bore of said cylinder and the rear section forming the larger rear end portion 10 of said bore. The smaller forward end portion 9 of the bore of the injection cylinder 8 is adapted to snugly receive the forward end portion of the ram 1 during the forward or pressure stroke thereof, said ram being entirely clear of the small portion of said bore at the end of its return stroke. As shown in the drawing, the reduced forward end portion 9 of the bore of the cylinder 8 opens at its outer end into the forwardly tapering outlet passageway 12a of an injection nozzle 12 that is threaded into the front end of said cylinder. Disposed in the adjacent ends of the cylinder 8 and nozzle 12 is a streamlined spreader or torpedo 12b; and reciprocable in the discharge end of the outlet passageway of said nozzle and an axial bore in said spreader is an inwardly opening discharge valve 13 that is closed by a spring 13a mounted in said last mentioned bore. The discharge valve 13 has a discharge passageway 13b that opens through the outer end thereof and is adapted to communicate with the outlet passageway 12a of the nozzle 12 when said valve is pressed inwardly against the pressure of the valve closing spring 13a. The outer or discharge end of the valve 13 is rounded, as at 13c, to exactly fit the correspondingly shaped mouth 14a of an entrance or gate 14 leading to the mold cavity 15a of a sectional die or mold 15, which is moved by any suitable means (not shown) into engagement with the valve 13 to move the same inwardly in the nozzle 12 and bring the discharge passageway 13b therefor into communication with said entrance or gate.

Mounted for rotary but non-axial sliding movement in the large inner end portion 10 of the axial bore of the injection cylinder 8 is a tubular shaft 16 having a large inner or rear end portion journaled in the rear end of said cylinder and in the front portion of the housing 4. The tubular shaft 16 is continuously rotated by gearing comprising a worm 17 journaled in the housing 4 and a worm gear 18 fixed to said shaft inside said housing. The tubular shaft 16 has a forward end portion 19 of reduced diameter, thereby forming an annular space 20 between said reduced portion and the wall of the large inner end portion 10 of the bore of the cylinder 8; and a granular or powdered molding compound is supplied to said annular space by a feed hopper 21 located above said cylinder and in continuous communication with said space adjacent to the rear end thereof through an inlet opening 22 in the wall of said cylinder. The reduced forward end portion 19 of the tubular shaft 16 has an external helical screw 23 formed thereon that has a snug working fit in the smooth large inner end portion 10 of the bore of the cylinder 8. The ram 1 has a snug sliding fit in the axial bore of the tubular shaft 16, and the forward end of the reduced threaded portion 19 of said shaft terminates short of the smaller outer end portion 9 of said bore and is tapered as at 24 to provide continuous communication between the annular space 20 and said smaller ram receiving end portions of said bore. As shown in the drawing, the injection cylinder 8 is heated preferably by means of one or more electric band heaters 25 which fit around said cylinder between the inlet opening 23 and the discharge nozzle 12.

By the arrangement described, molding material flows from the feed hopper through the inlet opening 22 in the heated injection cylinder 8 into the annular space 20 therein where it is engaged by the continuously rotating feed screw 23 and is forced thereby between the tapered end of the tubular shaft 16 and the tapered intermediate portion 11 of the bore of said cylinder into the reduced outer end portion 9 of said bore. During this forward movement of the molding material, the material is thoroughly mixed and uniformly heated to form a plastic or fluid mass, which fills the reduced forward end portion 9 of the bore of the injection cylinder and the space left in the forward end portion of the bore in the continuously rotating shaft 16 when the ram 1 is retracted. When it is desired to fill the mold 15, the mold is moved into contact with the outer end 13c of the discharge valve 13 to place the discharge passageway 13b thereof into communication with the entrance or gate 14 of said mold, and fluid is admitted to the rear end of the plunger or ram actuating cylinder 3 to force the ram forward. As the ram moves forward, it enters the reduced forward end portion 9 of the bore of the injection cylinder 8 and forces the fluid plastic in said reduced portion of said bore around the spreader 12b and outwardly through the outlet passageway 12a of the injection nozzle 12 and through the discharge passageway 13b of the valve 13 into the mold 15. The piston 2 is then moved rearwardly to retract the ram 1 and the mold moves away from the valve 13 permitting the same to close. In accordance with common practice, automatic controls (not shown) are provided so that the mold and ram are operated in proper timed relation and in repeated cycles.

The hereinbefore described injection molding device has numerous advantages. It greatly increases the quantity of material than can be plasticized in a given length of time without increasing the stroke of the injection ram, and it enables the diameter of the cylinder to be increased without loss of injection pressure and without increasing the power required to operate the ram. The helical feed screw acts as a conveyor to move the molding material forwardly in the injection cylinder; and it also exerts a relatively high continuous pressure on the material regardless of the position of the ram or plunger. This screw pressure feed also thoroughly mixes the material and insures a more uniform heating thereof and it also dispenses with devices heretofore employed for supplying the cylinder with accurately timed and measured charges of molding compound.

Obviously, the hereinbefore described injection molding machine admits of considerable modification without departing from the invention. Therefore, I do not wish to be limited to the precise arrangements shown and described.

What I claim is:

1. In a machine for injection molding of plastics, a heated cylinder having an axial bore with an inner end portion of relatively large diameter, an outer end portion of relatively small diameter and a tapered intermediate portion connecting the two end portions of said bore, a tubular member disposed in the large portion of said bore coaxial therewith and having a tapered outer end portion extending into said tapered intermediate portion of said bore and terminating short of the small portion thereof, the tapered portion of said tubular member cooperating with the tapered intermediate portion of said bore to form an uninterrupted annular passageway therebetween, said tubular member having an external screw rigid therewith snugly fitting the large portion of said bore, said cylinder having a feed opening communicating with the large portion of said bore adjacent to the innermost end of said screw, and a ram reciprocable in said tubular member, said ram entering the small portion of said bore during its forward stroke and being clear of said small portion at the end of its return stroke.

2. In a machine for injection molding of plastics, a heated cylinder having an axial bore with an inner end portion of relatively large diameter, an outer end portion of relatively small diameter and a tapered intermediate portion connecting the two end portions of said bore, a tubular member disposed in the large portion of said bore coaxial therewith and having a tapered outer end portion extending into the tapered intermediate portion of said bore and terminating short of the small portion thereof, the tapered portion of said tubular member cooperating with the tapered intermediate portion of said bore to form an uninterrupted annular passageway therebetween, said tubular member having an external screw rigid therewith snugly fitting the large portion of said bore, said cylinder having a feed opening communicating with the large portion of said bore adjacent to the innermost end of said screw, and a ram reciprocable in said tubular member and having a working end of solid circular section, said end of said ram entering the small portion of said bore during its forward stroke and being clear of said small portion at the end of its return stroke.

3. In a machine for injection molding of plastics, a heated cylinder having an axial bore with an inner end portion of relatively large diameter, an outer end portion of relatively small diameter and a tapered intermediate portion connecting the two end portions of said bore, a tubular member disposed in a large portion of said bore coaxial therewith and having a tapered outer end portion extending into said tapered intermediate portion of said bore and terminating short of the small portion thereof, said tapered portion of said tubular member cooperating with the tapered intermediate portion of said bore to form an uninterrupted annular passageway therebetween, said tubular member having an external screw rigid therewith snugly fitting the large portion of said bore, said cylinder having a feed opening communicating with the large portion of said bore adjacent to the innermost end of said screw, a ram reciprocable in said tubular member, said ram entering the small portion of said bore during its delivery stroke and being entirely clear of said small portion at the end of its return stroke, means for reciprocating said ram, means for rotating said tubular member, and an injection valve at the discharge end of the small portion of said bore for preventing discharge of the fluid plastic from and entry of air into the small portion of said bore during the return stroke of said ram.

4. In a machine for injection molding of plastics, a heated cylinder having an axial bore with an inner end portion of relatively large diameter, an outer end portion of relatively small diameter and a tapered intermediate portion connecting the two end portions of said bore, a tubular member disposed in the large portion of said bore coaxial therewith and having a tapered outer end portion extending into the tapered intermediate portion of said bore and terminating short of the small portion thereof, the tapered portion of said tubular member cooperating with the tapered intermediate portion of said bore to form an uninterrupted annular passageway therebetween, said tubular member having an external screw rigid therewith snugly fitting the large portion of said bore, said cylinder having a feed opening communicating with the large portion of said bore adjacent to the innermost end of said screw, a cooled ram reciprocable in and supported by said tubular member, said ram entering the small portion of said bore during its forward stroke and being entirely clear of such portion at the end of its return stroke, means for reciprocating said ram, means for continuously rotating said tubular member, whereby said screw is adapted to force the material from the large portion of said bore through the tapering intermediate portion thereof into the small portion thereof when the plunger is retracted, and an injection valve in the small portion of said bore adapted to prevent the escape of plastic therefrom during the continuous feeding movement of said screw.

GERALD A. GOESSLING.